(12) United States Patent
Cheung (10) Patent No.: US 8,718,126 B2
(45) Date of Patent: May 6, 2014

(54) ADAPTIVE EQUALIZER AND ADAPTIVE EQUALIZING METHOD

(75) Inventor: Tszshing Cheung, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 12/984,788

(22) Filed: Jan. 5, 2011

(65) Prior Publication Data

US 2011/0182347 A1   Jul. 28, 2011

(30) Foreign Application Priority Data

Jan. 25, 2010  (JP) .................................. 2010-13601

(51) Int. Cl.
*H03K 5/156* (2006.01)

(52) U.S. Cl.
USPC .......................................... 375/232; 375/233

(58) Field of Classification Search
CPC .................... H04L 25/03038; H04L 25/03057; H04L 2025/0349; H04L 2025/03509; H04L 1/0002; H04L 2025/03471; H04L 25/03885; H04L 27/01; H04N 5/357; H03K 5/14; H04B 2203/5416; H04B 10/6971; G11B 20/10046; H03F 2200/165
USPC ................... 375/229, 230, 232, 233, E7.052, 375/E7.002; 333/18, 28 R
See application file for complete search history.

(56) References Cited

U.S. PATENT DOCUMENTS

| | | | |
|---|---|---|---|
| 5,444,739 A | | 8/1995 | Uesugi et al. |
| 5,524,023 A | * | 6/1996 | Tsujimoto ..................... 375/232 |
| 5,602,484 A | * | 2/1997 | Suzuki et al. ................. 324/647 |
| 6,084,907 A | * | 7/2000 | Nagano et al. ................ 375/230 |
| 6,212,371 B1 | * | 4/2001 | Sakuma ..................... 455/343.3 |
| 6,442,274 B1 | * | 8/2002 | Sugiyama ................ 379/406.08 |
| 7,813,415 B2 | * | 10/2010 | Wu et al. ........................ 375/219 |
| 2003/0138038 A1 | * | 7/2003 | Greiss et al. .................. 375/232 |
| 2006/0294170 A1 | | 12/2006 | Matsuoka et al. |
| 2008/0075160 A1 | * | 3/2008 | Yamaguchi ................... 375/233 |
| 2011/0134989 A1 | * | 6/2011 | Tong ............................. 375/232 |

FOREIGN PATENT DOCUMENTS

| | | |
|---|---|---|
| JP | 5-75393 A | 3/1993 |
| JP | 11-313013 A | 11/1999 |
| JP | 2004-5893 A | 1/2004 |
| JP | 2007-6264 A | 1/2007 |
| JP | 2009-81612 A | 4/2009 |
| JP | 2010-118817 A | 5/2010 |
| WO | WO-2008/109607 A1 | 9/2008 |

OTHER PUBLICATIONS

Bergmans, Jan W.M., "Digital Baseband Transmission and Recording", Kluwer Academic Publishers, Oct. 31, 1996, pp. 122-124.
Japanese Office Action mailed Nov. 12, 2013 for corresponding Japanese Application No. 2010-013601, with Partial English-language Translation.

* cited by examiner

*Primary Examiner* — Tesfaldet Bocure
(74) *Attorney, Agent, or Firm* — Fujitsu Patent Center (57) ABSTRACT

An adaptive equalizer includes an equalization circuit and an operation number change unit. The equalization circuit includes a plurality of cascade-coupled delay taps. The equalization circuit equalizes an input signal by adding calculation results of the plurality of delay taps. The operation number change unit changes a number of operations of the plurality of delay taps according to an equalization error of the equalization circuit.

18 Claims, 12 Drawing Sheets

ADAPTIVE EQUALIZER AND ADAPTIVE EQUALIZING METHOD

CROSS-REFERENCE TO RELATED APPLICATIONS

This application is based upon and claims the benefit of priority of the prior Japanese Patent Application No. 2010-13601, filed on Jan. 25, 2010, the entire contents of which are incorporated herein by reference.

FIELD

Embodiments discussed herein relate to an adaptive equalizer and an adaptive equalizing method.

BACKGROUND

In general, a plurality of delay taps are cascade-coupled in an adaptive equalizer. A calculation coefficient is set in each of the delay taps. In the above-described configuration, equalization error generated by channel loss or the like may be reduced by updating the calculation coefficient. However, for a conventional adaptive equalizer, the number of delay taps is preferably designed according to the maximum channel loss. Due to this, power consumption may not be reduced. There is a disclosed technique that an equalizer of a data reception device reduces the total number of taps by distributing the optimum number of taps for each burst (see, for example, Japanese Laid-open Patent Publication No. 05-75393).

However, the equalizer according to this technique does not reduce the total number of taps based on error detection, so that equalization accuracy may not be maintained.

SUMMARY

According to an aspect of the invention, an adaptive equalizer includes an equalization circuit and an operation number change unit. The equalization circuit includes a plurality of cascade-coupled delay taps. The equalization circuit equalizes an input signal by adding up calculation results of the plurality of delay taps. The operation number change unit changes a number of operations of the plurality of delay taps according to an equalization error of the equalization circuit.

The objects and advantages of the invention will be realized and attained at least by the elements, features, and combinations particularly pointed out in the claims. It is to be understood that both the foregoing general description and the following detailed description are exemplary and explanatory and are not restrictive of the invention, as claimed.

DESCRIPTION OF EMBODIMENTS

Embodiments of the invention will be described below with reference to the accompanying drawings.

First Embodiment

Figure 1:
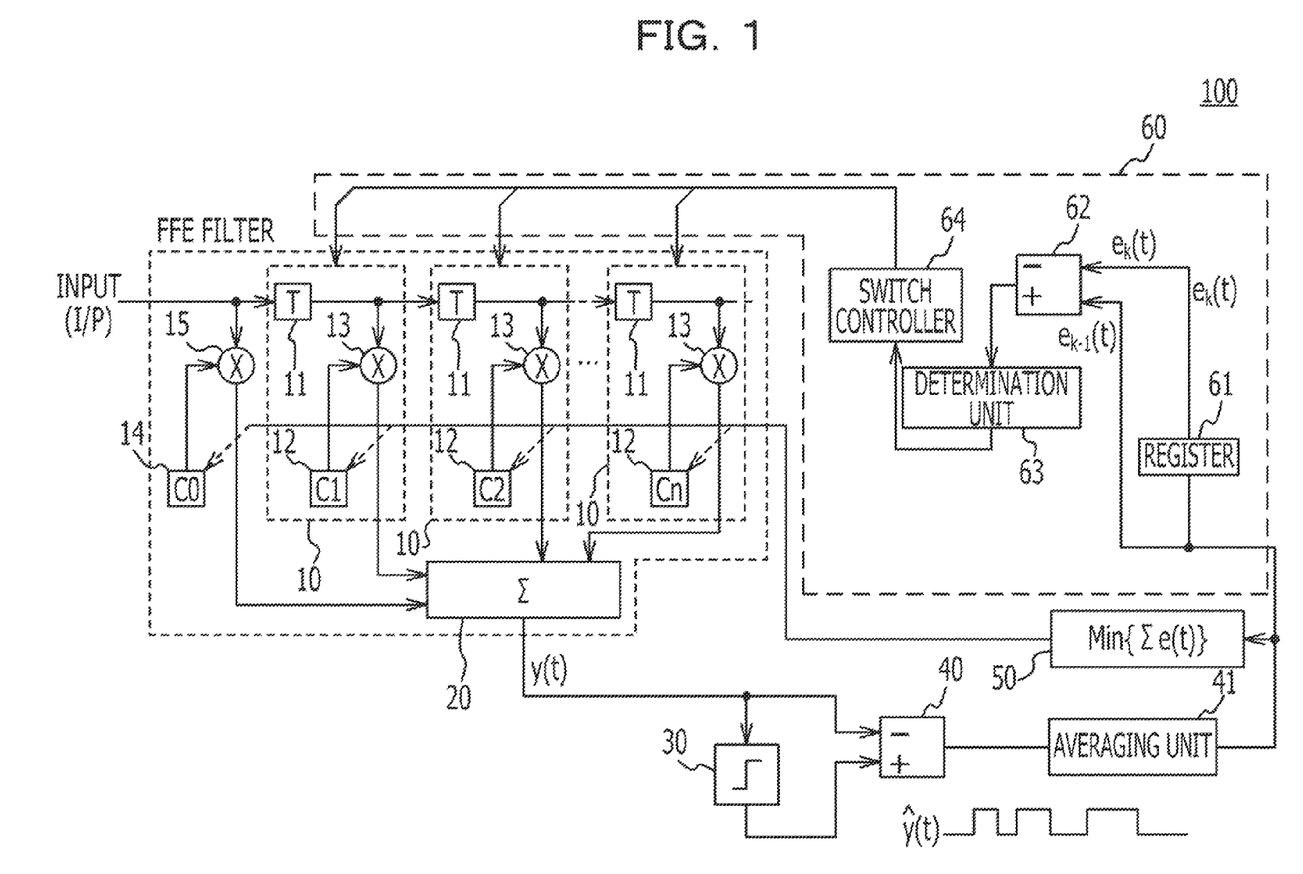
FIG. 1 is a block diagram illustrating a configuration of an adaptive equalizer according to a first embodiment.

FIG. 1 is a block diagram illustrating a configuration of an adaptive equalizer 100 according to a first embodiment. The adaptive equalizer 100 may be implemented in a semiconductor integrated circuit. With reference to FIG. 1, the adaptive equalizer 100 includes a plurality of delay taps 10, an addition unit 20, an identification unit 30, a subtraction unit 40, an averaging unit 41, a coefficient setting unit 50, and a control unit 60.

According to the first embodiment, n (n is an integer equal to or more than 2) delay taps 10 are provided and cascade-coupled. Accordingly, signals (I/P) to be input into the adaptive equalizer 100 are input into the delay taps 10 in a sequence from the delay tap 10 at a former stage to the delay taps 10 at a latter stage. Each of the delay taps 10 includes a delay unit 11, a coefficient storage unit 12, and a multiplication unit 13. Each of the delay taps 10 operates if a power source is turned on and stops if the power source is turned off. At this time, the total number of the delay taps 10 provided in the adaptive equalizer 100 is referred to as a total number of taps. Furthermore, the total number of the delay taps 10 operating when the power source is turned on is referred to as the number of operating taps. Therefore, if n delay taps 10 are all operating, the total number of taps and the number of operating taps is "n."

Each of the delay units 11 is inserted into a transmission path used to couple the delay taps 10, and a delay amount of a prescribed time is set to a signal to be input. Therefore, the signal (I/P) to be input into the adaptive equalizer 100 is added with the delay amount every time the signal is transmitted through each of the delay taps 10. The coefficient storage unit 12, which is a storage unit such as a register, stores a calculation coefficient that is set by the coefficient setting unit 50. Here, the coefficient storage unit 12 of the delay tap 10 at a forefront (a first stage) stores a coefficient C1. The coefficient storage units 12 of the delay taps 10 store coefficients C2 to Cn sequentially toward the latter stages. That is, the coefficient storage units 12 of the delay taps 10 at a second stage to the n-th stage store coefficients corresponding to the stages thereof, respectively. In each of the delay taps 10, the multiplication unit 13 outputs a multiplication result of the signal (I/P) added with the delay amount by the delay unit 11 and the coefficient stored in the coefficient storage unit 12.

A coefficient storage unit 14 and a multiplication unit 15 are provided at a former stage of the first stage at which the delay tap 10 is provided. The coefficient storage unit 14 stores a coefficient C0 that is set by the coefficient setting unit 50. The multiplication unit 15 outputs a multiplication result of the signal (I/P) before being input into the delay tap 10 at the first stage and the coefficient C0.

The addition unit 20 adds up all the output results of the multiplication unit 13 and the multiplication unit 15 and outputs the sum of the output results. The addition unit 20 inputs the above-described sum as an equalization output y (t) into the identification unit 30. The identification unit 30 generates and outputs decoding data by identifying the equalization output y (t) as "0" and "1." The generated decoding data is expressed as the following formula (1). In the formula (1), "t" indicates a period after operation of the equalizer starts, and the equalization output y (t) varies according to the period.

$$\hat{y}(t) \quad (1)$$

The above-described decoding data is input into a positive side of the subtraction unit 40. The above-described equalization output is input into a negative side of the subtraction unit 40. The subtraction unit 40 calculates an error value e(t) based on the following formula (2) by subtracting the equalization output from the decoding data. The averaging unit 41 calculates and outputs an average value $|\mathrm{Avg}\{e(t)\}|$ of the error value e(t). According to the first embodiment, the above-described error value e(t) is used as an evaluation function. The above-described average value may be expressed as the following formula (3). The average value of the formula (3) is referred to as an average error. In the formula (3), "n" indicates the number of operating taps. Therefore, if the number of operating taps is "k," "n" in the formula (3) is "k."

The coefficient setting unit 50 reduces the average error of the formula (3). The coefficient setting unit 50 updates the coefficients C0 to Cn of the multiplication unit 15 and the multiplication units 13 to coefficients corresponding to the reduction of the average error of the formula (3), and outputs the coefficients to the coefficient storage unit 14 and the coefficient storage units 12. Accordingly, the coefficients C0 to Cn are enhanced. There is a least-mean-square method as a method for calculating the coefficients C0 to Cn.

$$e(t) = \hat{y}(t) - y(t) \quad (2)$$

$$\overline{\Sigma_n \{e(t)\}} = |\mathrm{Avg}\{e(t)\}| \quad (3)$$

The control unit 60 includes a register 61, a subtraction unit 62, a determination unit 63, and a switch controller 64. The register 61 stores a calculation result of the averaging unit 41. The subtraction unit 62 subtracts data stored in the register 61 from the calculation result of the averaging unit 41 and outputs the calculation result. Calculation of the subtraction unit 62 will be described below. The determination unit 63 determines whether or not an absolute value of an output value of the subtraction unit 62 is less than a threshold value. The switch controller 64 turns on/off the power supply to each of the delay taps 10 based on a determination result of the determination unit 63. Therefore, the control unit 60 functions as an operation number change unit.

Each of the delay taps 10, the coefficient storage unit 14, the multiplication unit 15, the addition unit 20 function as an equalization circuit. Particularly, in the adaptive equalizer 100 according to the first embodiment, each of the delay taps 10, the coefficient storage unit 14, the multiplication unit 15, and the addition unit 20 function as a Feed Forward Equalization (FFE) filter.

Figure 2A:
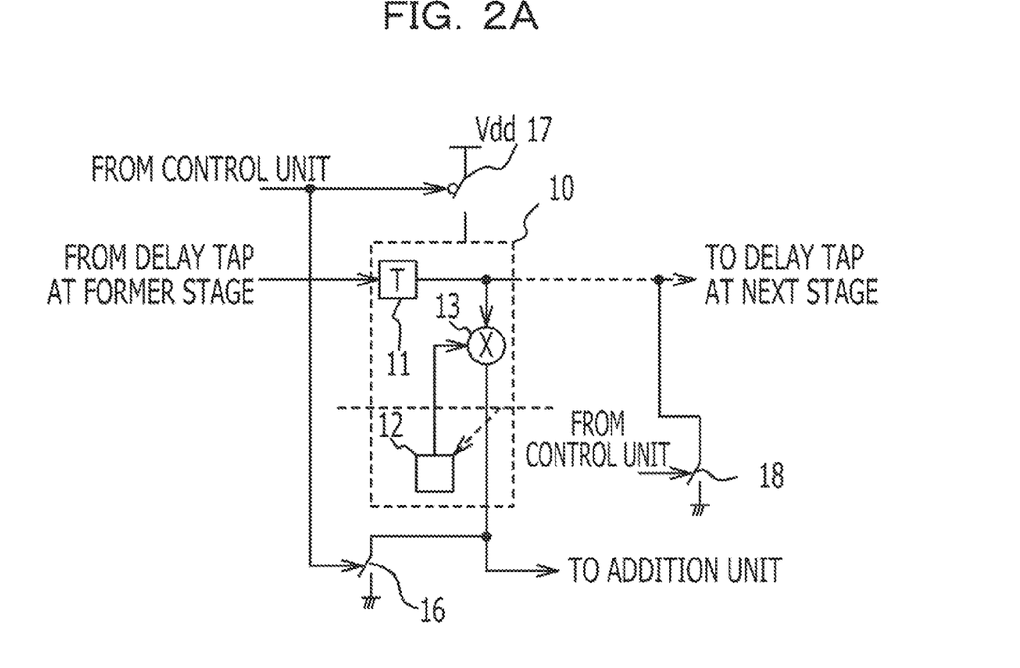
FIG. 2A is a diagram illustrating details of a switch for turning on/off a power supply to each delay tap.

FIG. 2A is a diagram illustrating details of a switch for turning on/off the power supply to each of the delay taps 10. With reference to FIG. 2A, the delay tap 10 includes a first switch 16, a second switch 17, and a third switch 18. The first switch 16 is a switch for switching whether or not a transmission path from the multiplication unit 13 to the addition unit 20 is coupled to the ground. The second switch 17 is a switch for switching whether or not a power source Vdd is coupled to the delay tap 10. The third switch 18 is a switch for switching whether or not the transmission path used to couple the delay taps 10 is coupled to the ground.

Figure 2B:
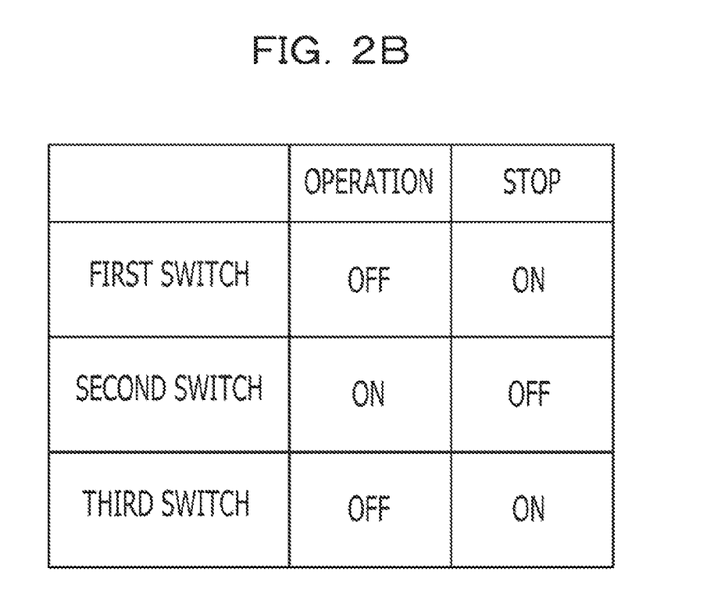
FIG. 2B is a table illustrating a relation of turning on/off of each switch for operating or stopping a delay tap.

As illustrated in the table in FIG. 2B, to operate the delay tap 10, the switch controller 64 illustrated in FIG. 1 turns off the first switch 16, turns on the second switch 17, and turns off the third switch 18. Consequently, the power is supplied to the delay tap 10 from the power source Vdd, the calculation result of the multiplication unit 13 is output to the addition unit 20 illustrated in FIG. 1, and the signal added with the delay amount by the delay unit 11 is output to the delay tap 10 at the next stage. On the other hand, to stop the operation of the delay tap 10, the switch controller 64 turns on the first switch 16, turns off the second switch 17, and turns on the third switch 18. Consequently, the power supply to the delay tap 10 is stopped, and the delay unit 11 and the multiplication unit 13 are grounded. As a result, the operation of the delay tap 10 is stopped, and the number of operating taps is reduced by one.

Figure 3:
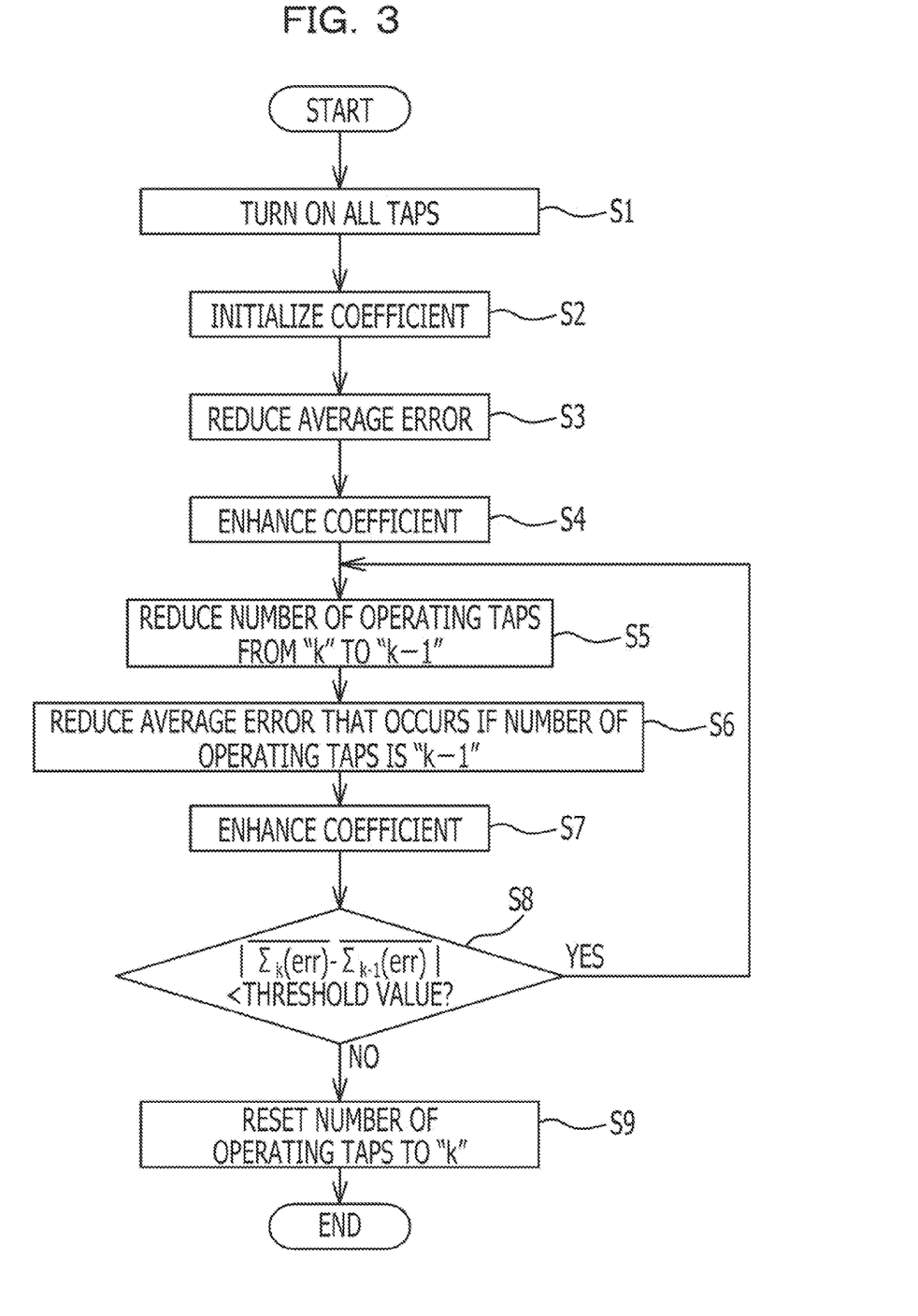
FIG. 3 is an example flowchart of a method to be performed for coefficient optimization control and operating tap number control.

Coefficient optimization control and operating tap number control in the adaptive equalizer 100 will be described in detail. FIG. 3 is an example flowchart of a method to be performed for the coefficient optimization control and the operating tap number control. With reference to FIG. 3, the switch controller 64 turns on all the delay taps 10 (Operation S1). The coefficient setting unit 50 initializes the coefficients C0 to Cn stored in the coefficient storage unit 14 and the coefficient storage units 12 (Operation S2).

The coefficient setting unit 50 reduces the average error (Operation S3). The coefficient setting unit 50 stores the coefficients C0 to Cn corresponding to the result obtained in Operation S3 in the coefficient storage unit 14 and the coefficient storage units 12 (Operation S4). Consequently, each of the coefficients is enhanced. The coefficients C0 to Ck to be stored in Operation 4 are stored also in the register 61. The switch controller 64 reduces the number of operating taps from "k" to "k−1" (Operation S5). The initial value of the number of operating taps as "k" is set to the number (n) of delay taps 10 provided in the adaptive equalizer 100. Furthermore, to reduce the number of operating taps one by one, the switch controller 64 turns off the delay tap 10 at the final stage from among the delay taps 10 currently operating.

The coefficient setting unit 50 reduces the average error that occurs if the number of operating taps is "k−1" (Operation S6). The coefficient setting unit 50 stores the coefficients C0 to Ck−1 corresponding to the result, which is obtained in Operation S6, in the coefficient storage unit 14 and the coefficient storage units 12 at the first stage to the "k−1"-th stage (Operation S7). Consequently, each of the coefficients is enhanced.

The determination unit 63 determines whether or not the absolute value, which is obtained by subtracting the average error that occurs if the number of operating taps is "k−1" from the average error that occurs if the number of operating taps is "k," is less than the threshold value (Operation S8). In Operation S8, the average error, which occurs if the number of operating taps is "k," is read from the register 61. If Yes in Operation S8, Operations S5, S6, S7, and S8 are again performed. If No in Operation S8, the switch controller 64 resets the number of operating taps to "k" (Operation S9). In this case, the switch controller 64 turns on the delay tap 10 that was turned off in Operation S5. The performance of the method then ends.

According to the flowchart illustrated in FIG. 3, since the average error may be reduced, the coefficients C0 to Cn may be enhanced. Moreover, since the number of operating taps may be reduced until the reduction amount of the average error becomes equal to or less than the prescribed value, the power consumption of the adaptive equalizer 100 may be reduced while the adaptive equalization accuracy is maintained. In the flowchart illustrated in FIG. 3, although the value, which is obtained by subtracting the average error that occurs if the number of operating taps is "k−1" from the average error that occurs if the number of operating taps is "k," is used as a determination standard, the number of operating taps may be reduced within a range where the average error becomes equal to or less than the prescribed value.

Figure 4:
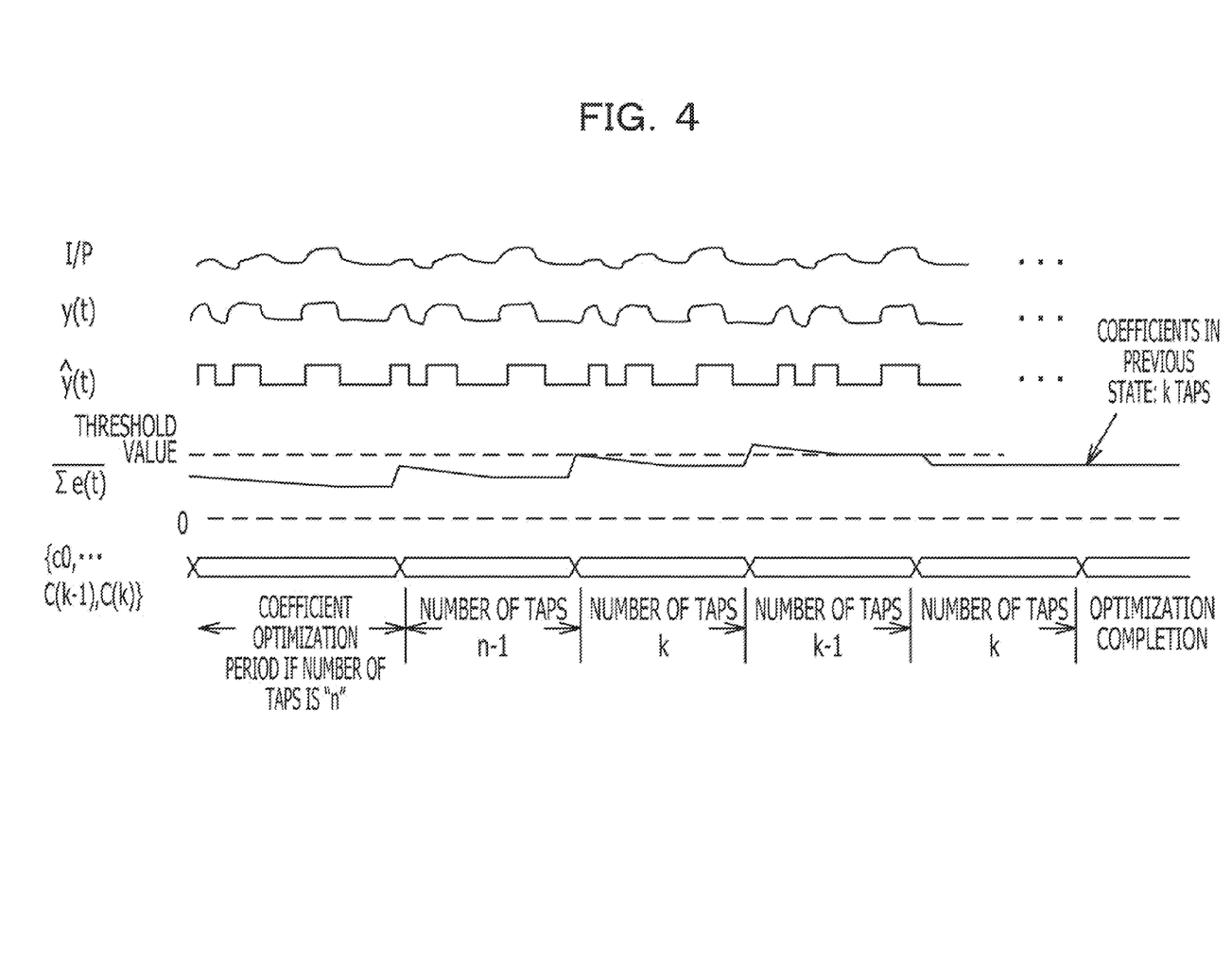
FIG. 4 is a diagram illustrating an effect of the adaptive equalizer according to the first embodiment.

FIG. 4 is a diagram illustrating an effect of the adaptive equalizer according to the first embodiment. In FIG. 4, a transverse axis indicates an elapsed time. With reference to FIG. 4, the signal (I/P) to be input into the adaptive equalizer 100 is shaped in a deformed wave rather than a perfect square wave. The equalization output y(t) is approximated to be in a square wave by adaptive equalizing processing performed by the adaptive equalizer 100. The decoding data obtained from the equalization output y (t) is identified by the identification unit 30.

Coefficient optimization by the coefficient setting unit 50 reduces the average error. With reference to FIG. 4, the average error indicates the lowest value at a time when the coefficient optimization is completed. In the example of FIG. 4, the average error exceeds the threshold value if the number of operating taps is reduced by four. Accordingly, the number of operating taps may be reduced by three in the example illustrated in FIG. 4.

Figure 5A:
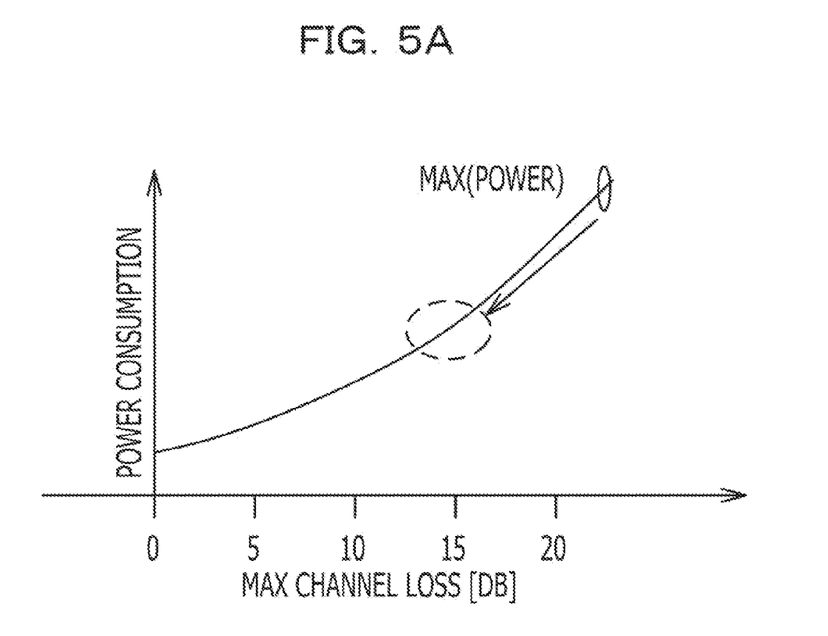
FIG. 5A is a diagram illustrating a relation between maximum channel loss and power consumption of an adaptive equalizer 100.
Figure 5B:
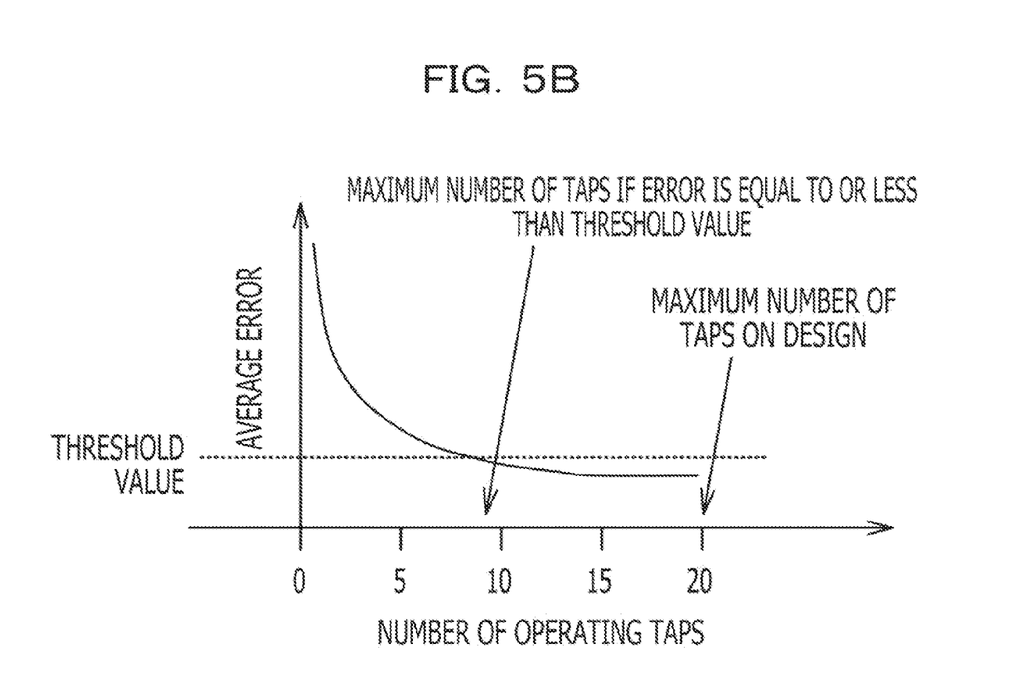
FIG. 5B is a diagram illustrating a relation between number of operating taps and an average error.

FIGS. 5A and 5B are diagrams illustrating an effect of the reduction of the number of operating taps. FIG. 5A is a diagram illustrating a relation between the maximum channel loss and the power consumption of the adaptive equalizer 100. In FIG. 5A, the transverse axis indicates the maximum channel loss, and the longitudinal axis indicates power consumption. In general, since an equalizer is designed according to the maximum channel loss, power consumption increases as the total number of taps is increased. In contrast, by using the adaptive equalizer 100 according to the first embodiment, the power consumption may be reduced because the number of operating taps to which the power is supplied may be reduced.

FIG. 5B is a diagram illustrating a relation between the number of operating taps and an average error. In FIG. 5B, the transverse axis indicates the number of operating taps, and the longitudinal axis indicates an average error. With reference to FIG. 5B, if the number of operating taps is larger, the average error is reduced. This is because the adaptive equalization accuracy is improved. However, a reduction width of the average error becomes smaller as the number of operating taps is increased. Accordingly, if the average error is equal to or less than the threshold value, the power consumption is reduced by reducing the number of operating taps more efficiently than by increasing the number of operating taps. For this, by using the adaptive equalizer 100 according to the first embodiment, the power consumption may be reduced while the average error is maintained to be equal to or less than the prescribed value.

According to the first embodiment, the power supply to the delay tap 10 at the final stage during operation is stopped to reduce the number of operating taps. The power supply to any of the delay taps 10 may also be stopped. In this case, since the delay tap 10 at the final stage has the smallest effect on the adaptive equalization accuracy, the power supply to the delay tap 10 at the final stage during operation is preferably stopped.

Second Embodiment

Figure 6:
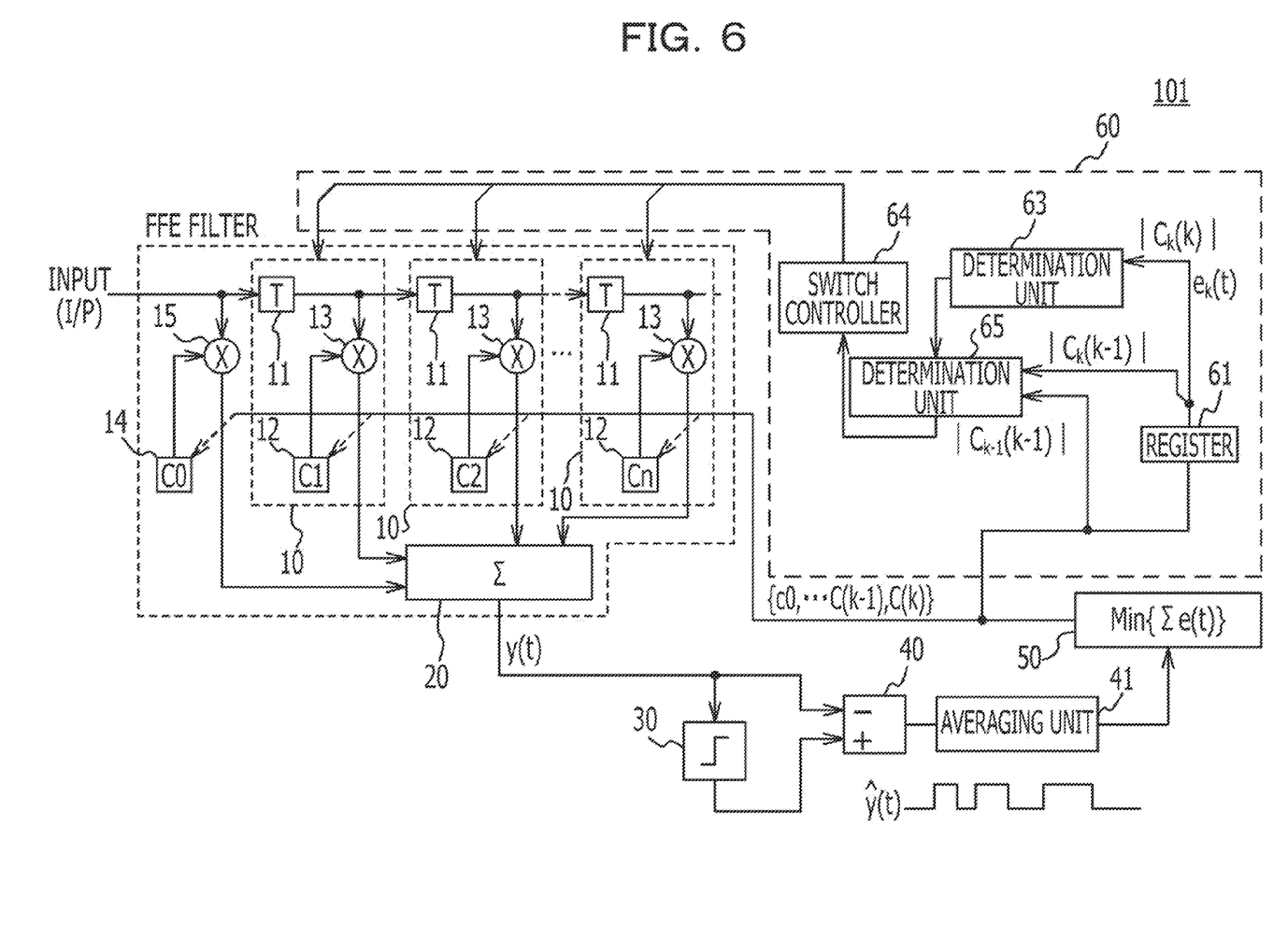
FIG. 6 is a block diagram illustrating a configuration of an adaptive equalizer according to a second embodiment.

FIG. 6 is a block diagram illustrating a configuration of an adaptive equalizer 101 according to a second embodiment. With reference to FIG. 6, the adaptive equalizer 101 according to the second embodiment is different from the adaptive equalizer 100 illustrated in FIG. 1 in that the adaptive equalizer 101 includes a determination unit 65 instead of the subtraction unit 62. Descriptions of other configurations are omitted by being indicated with the same numerals.

In the adaptive equalizer 101, each coefficient set by the coefficient setting unit 50 is input into the determination unit 65 and is stored in the register 61. Each coefficient stored in the register 61 is input into the determination unit 63 and the determination unit 65. The determination unit 63 determines whether or not an absolute value of a prescribed coefficient stored in the register 61 is less than the threshold value. Based on the determination result of the determination unit 63, the determination unit 65 determines whether or not the absolute value of the difference between the prescribed coefficient stored in the register 61 and the prescribed coefficient set by the coefficient setting unit 50 is less than the threshold value. The determination of the determination unit 65 will be described in detail. The switch controller 64 turns on/off the power supply to the delay tap 10 based on the determination result of the determination unit 63 and the determination unit 65.

The second embodiment focuses a coefficient that is set in each of the delay taps 10. Specifically, the delay tap 10, whose coefficient to be set is sufficiently small, does not affect adaptive equalization. Accordingly, reduction of the adaptive equalization accuracy may be reduced even if the power supply to the delay tap 10 whose coefficient to be set is sufficiently small is stopped. On the other hand, the power consumption of the adaptive equalizer 101 may be reduced.

Figure 7:
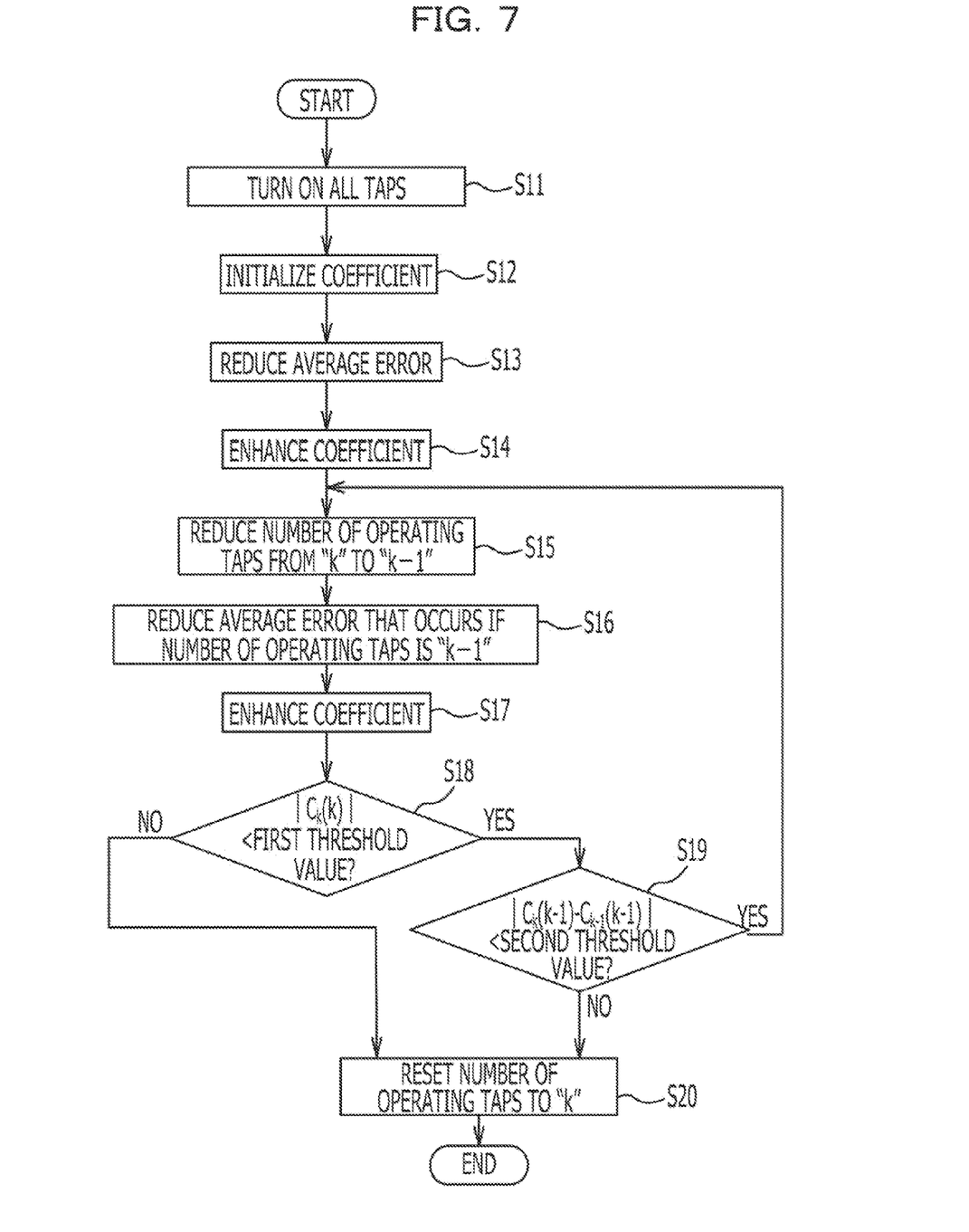
FIG. 7 is an example flowchart of a method to be performed for the coefficient optimization control and the operating tap number control.

The coefficient optimization control and the operating tap number control will be described in detail. FIG. 7 is an example flowchart of a method to be performed for the coefficient optimization control and the operating tap number control. With reference to FIG. 7, the switch controller 64 turns on all the delay taps 10 (Operation S11). The coefficient setting unit 50 initializes the coefficients C0 to Cn stored in the coefficient storage unit 14 and the coefficient storage units 12 (Operation S12).

The coefficient setting unit 50 reduces the average error (Operation S13). The coefficient setting unit 50 stores the coefficients C0 to Cn corresponding to the result, which is obtained in Operation S13, in the coefficient storage unit 14 and the coefficient storage units 12 (Operation S14). Consequently, each of the coefficients is enhanced. The coefficients C0 to Ck to be stored in Operation S14 are stored also in the register 61. The switch controller 64 reduces the number of operating taps from "k" to "k−1" (Operation S15). The initial value of the number of operating taps as "k" is set to the number (n) of the delay taps 10 provided in the adaptive equalizer 101. To reduce the number of operating taps one by one, the switch controller 64 turns off the delay tap 10 at the final stage from among the delay taps 10 during operation.

The coefficient setting unit 50 reduces the average error that occurs if the number of operating taps is "k−1" (Operation S16). The coefficient setting unit 50 stores the coefficients C0 to Ck−1 corresponding to the result, which is obtained in Operation S16, in the coefficient storage unit 14 and the coefficient storage units 12 at the first stage to the "k−1"-th stage (Operation S17). Consequently, each of the coefficients is enhanced.

The determination unit 63 obtains, from the register 61, a coefficient Ck (k) in the "k"-th position obtained if the number of operating taps is "k", and determines whether or not the absolute value of the coefficient Ck (k) is less than a first threshold value (Operation S18). The value that is less than the average value of the coefficients C0 to Ck may be used as the first threshold value. If Yes in Operation S18, the determination unit 65 obtains, from the register 61, a coefficient Ck (k−1) at the "k−1"-th position obtained if the number of operating taps is "k." The determination unit 65 obtains, from the coefficient setting unit 50, a coefficient Ck−1 (k−1) at the "k−1"-th position obtained if the number of operating taps is "k−1." The determination unit 65 determines whether or not the absolute value of a difference between the coefficient Ck (k−1) and the coefficient Ck−1 (k1) is less than a second threshold value (Operation S19). The value that is less than the average value of the coefficients C0 to Ck may be used as the second threshold value.

If Yes in Operation S19, Operations S15, S16, S17, S18, and S19 are again performed. If No in Operations S18 and S19, the switch controller 64 resets the number of operating taps to "k" (Operation S20). In this case, the switch controller 64 turns on the delay tap 10 that was turned off in Operation S15. The performance of the method then ends.

According to the flowchart illustrated in FIG. 7, the coefficients C0 to Cn may be enhanced because the average error may be reduced. Moreover, since the power supply to the delay tap 10 whose coefficient to be set is sufficiently small is stopped, the reduction amount of the average error, which is obtained when the number of operating taps is reduced, may be controlled to be equal to or less than the prescribed value. Therefore, the power consumption may be reduced while the adaptive equalization accuracy is maintained. Furthermore, since in Operation S19 it is confirmed that there is no large change in the coefficient at the "k−1"-th position even if the number of operating taps is reduced from "k" to "k−1," the adaptive equalization accuracy is maintained.

Third Embodiment

Figure 8:
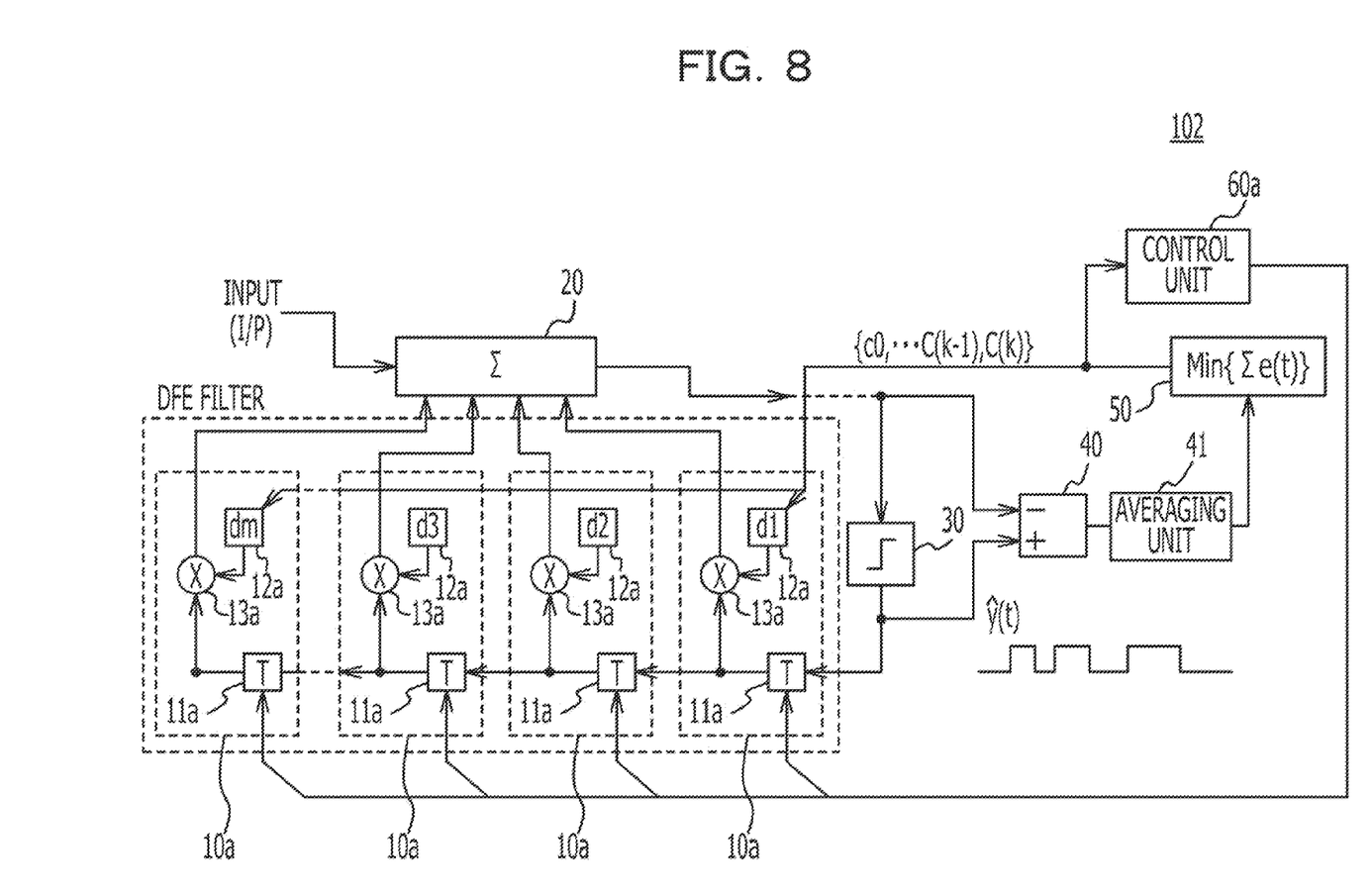
FIG. 8 is a block diagram illustrating a configuration of an adaptive equalizer according to a third embodiment.

FIG. 8 is a block diagram illustrating a configuration of an adaptive equalizer 102 according to a third embodiment. With reference to FIG. 8, the adaptive equalizer 102 according to the third embodiment is different from the adaptive equalizer 100 illustrated in FIG. 1 in that the adaptive equalizer 102 is provided with a Decision Feedback Equalization (DFE) filter instead of the FFE filter as a filter. Descriptions of other configurations are omitted by being indicated with the same numerals. The delay tap 10a has the function substantially equivalent to the delay tap 10 illustrated in FIG. 1. Accordingly, a delay unit 11a, a coefficient storage unit 12a, and a multiplication unit 13a illustrated in FIG. 8 have the functions substantially equivalent to the delay unit 11, the coefficient storage unit 12, and the multiplication unit 13.

As with the FFE filter illustrated in FIG. 1, the DFE filter has a configuration in which a plurality of delay taps 10a are cascade-coupled. The signal (I/P) to be input into the adaptive equalizer 102 is input into the addition unit 20. Furthermore, the output result of the multiplication unit 13a of each of the delay taps 10a is input into the addition unit 20. The addition unit 20 adds up all the output results of the multiplication units 13a and outputs the sum of the output results. The addition result of the addition unit 20 is input as an equalization output y (t) into the identification unit 30. The identification unit 30 generates and outputs decoding data by identifying the equalization output y (t) as "0" and "1."

The decoding data is input into the delay tap 10a at the forefront stage (the first stage). The decoding data is input into the delay taps 10a in the sequence from the delay tap 10a at the first stage to the delay taps 10a at the latter stage. Each of the delay units 11a adds the delay amount of the prescribed time to a signal to be input and outputs the signal. The coefficient storage units 12a of the delay taps 10a store coefficients d1 to dm (m is an integer more than 2), respectively. In each of the delay taps 10a, the multiplication unit 13a inputs, into the addition unit 20, a multiplication result of the decoding data added with the delay amount by the delay unit 11a and the coefficient stored in the coefficient storage unit 12a.

On the other hand, the decoding data output from the identification unit 30 is also input into the positive side of the subtraction unit 40. The equalization output that is output from the addition unit 20 is also input into the negative side of the subtraction unit 40. The subtraction unit 40 calculates an error value e(t) by subtracting the equalization output from the decoding data. The averaging unit 41 calculates and outputs an average error |Avg{e(t)}| of the error value e(t) as an average error. The coefficient setting unit 50 reduces the average error. The coefficient setting unit 50 updates the coefficients d1 to dm of the multiplication units 13a to coefficients corresponding to the reduction of the average error and outputs the coefficients to the coefficient storage units 12a, respectively. Consequently, the coefficients d1 to dm are enhanced. There is a least-mean-square method as a method for calculating the coefficients d1 to dm.

According to the third embodiment, as in the first embodiment, the control unit 60 may reduce the number of operating taps within the range where the average error is less than the threshold value. The control unit 60 may reduce the number of operating taps until the reduction amount of the average error, which occurs when the number of operating taps is reduced, becomes equal to or less than the prescribed value. Furthermore, as in the second embodiment, the control unit 60 may reduce the number of operating taps by stopping the power supply to the delay tap 10a whose coefficient to be set is sufficiently small. This makes it possible to reduce the power consumption of the adaptive equalizer 102 while the adaptive equalization accuracy is maintained.

Fourth Embodiment

Figure 9:
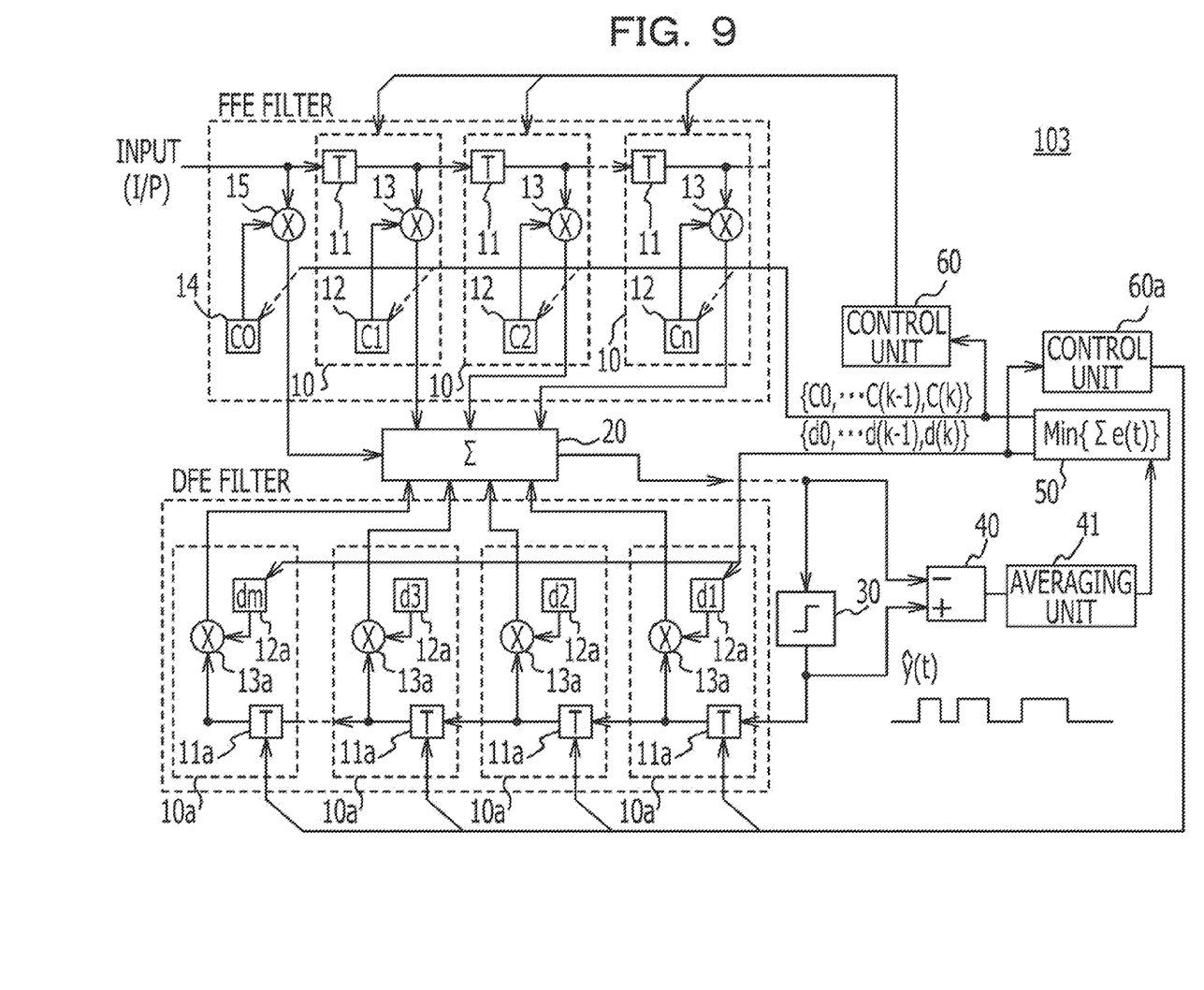
FIG. 9 is a block diagram illustrating a configuration of an adaptive equalizer according to a fourth embodiment.

FIG. 9 is a block diagram illustrating a configuration of an adaptive equalizer 103 according to a fourth embodiment. With reference to FIG. 9, the adaptive equalizer 103 according to the fourth embodiment is different from the adaptive equalizer 100 illustrated in FIG. 1 in that the adaptive equalizer 103 is provided with both the FFE filter and the DFE filter as a filter. Descriptions of other configurations are omitted by being indicated with the same numerals. A control unit 60a has the function substantially equivalent to the control unit 60.

According to the fourth embodiment, the output results of the multiplication unit 15 and the multiplication units 13 in the FFE filter are input into the addition unit 20, and the output results of the multiplication units 13a in the DFE filter are input into the addition unit 20. The addition unit 20 adds up all the output results of the multiplication unit 15, the multiplication units 13, and the multiplication units 13a, and outputs the sum of the output results. The addition result of the addition unit 20 is input as the equalization output y(t) into the identification unit 30. The identification unit 30 generates and outputs the decoding data by identifying the equalization output y (t) as "0" and "1."

The decoding data is input into the delay tap 10 at the forefront stage (the first stage) in the DFE filter and is also input into the positive side of the subtraction unit 40. The equalization output that is output from the addition unit 20 is also input into the negative side of the subtraction unit 40. The subtraction unit 40 calculates the error value e(t) by subtracting the equalization output from the decoding data. The averaging unit 41 calculates and outputs the average value |Avg{e (t)}| of the error value e(t) as an average error. The coefficient setting unit 50 reduces the average error. The coefficient setting unit 50 updates the coefficient C0 of the coefficient storage unit 14 and the coefficients C1 to Cn of the coefficient storage units 12 in the FFE filter to coefficients corresponding to the reduction of the average error, and outputs the coefficients to the coefficient storage unit 14 and the coefficient storage units 12 in FFE filter. Moreover, the coefficient setting unit 50 updates the coefficients d1 to dm of the coefficient storage units 12a in the DFE filter to the coefficients corresponding to the reduction of the average error, and outputs the coefficients to the coefficient storage units 12a in the DFE filter. Consequently, the coefficients C0 to Cn and the coefficients d1 to dm are enhanced.

As in the first embodiment, the control unit 60 in the FFE filter and the control unit 60a in the DFE filter may reduce the number of operating taps within the range where the average error is less than the threshold value. Moreover, the above-described control unit 60 and the control unit 60a may reduce the number of operating taps until the reduction amount of the average error, which is obtained when the number of operating taps is reduced, becomes equal to or less than the prescribed value. Furthermore, as in the second embodiment, the above-described control unit 60 and the control unit 60a may reduce the number of operating taps by stopping the power supply to the delay tap 10 whose coefficient to be set is sufficiently small. This makes it possible to reduce the power consumption of the adaptive equalizer 103 while the adaptive equalization accuracy is maintained.

Figure 10:
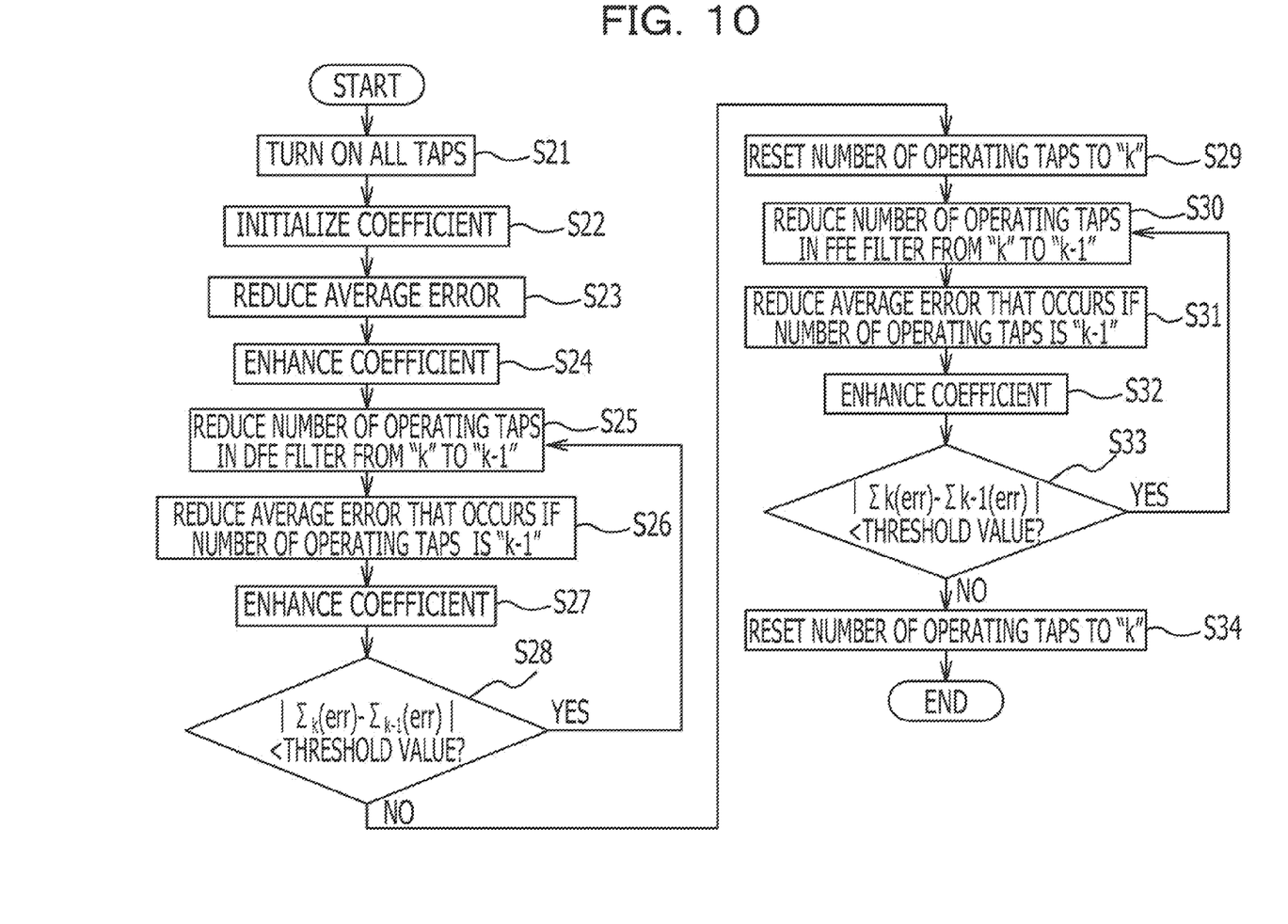
FIG. 10 is an example flowchart of a method to be performed for the coefficient optimization control and the operating tap number control.

FIG. 10 is an example flowchart of a method to be performed for the coefficient optimization control and the operating tap number control. With reference to FIG. 10, the control unit 60 in the FFE filter and the control unit 60a in the DFE filter turn on all the delay taps 10 (Operation S21). The coefficient setting unit 50 initializes the coefficients C0 to Cn stored in the coefficient storage unit 14 and the coefficient storage units 12 in the FFE filter. The coefficient setting unit 50 initializes the coefficients d1 to do stored in the coefficient storage units 12a in the DFE filter (Operation S22).

The coefficient setting unit 50 reduces the average error (Operation S23). The coefficient setting unit 50 stores the coefficients C0 to Cn corresponding to the result, which is obtained in Operation S23, in the coefficient storage unit 14 and the coefficient storage units 12 in the FFE filter. The coefficient setting unit 50 stores the coefficients d1 to dm corresponding to the result, which is obtained in Operation S23, in the coefficient storage units 12a in the DFE filter (Operation S24).

The control unit 60a in the DFE filter reduces the number of operating taps in the DFE filter from "k" to "k–1" (Operation S25). The initial value of the number of operating taps as "k" is set to the number (m) of delay taps 10a provided in the DFE filter. The coefficient setting unit 50 reduces the average error that occurs if the number of operating taps is "k–1" (Operation S26). The coefficient setting unit 50 stores the coefficients d1 to dk–1 corresponding to the result, which is obtained in Operation S26, in the coefficient storage units 12a in the DFE filter (Operation S27).

The control unit 60a in the DFE filter determines whether or not the absolute value of the value, which is obtained by subtracting the average error that occurs if the number of operating taps "k–1" from the average error that occurs if the number of operating taps is "k," is less than the threshold value (Operation S28). If Yes in Operation S29, Operations S25, S26, S27, and S28 are again performed. If No in Operation S28, the control unit 60a in the DFE filter resets the number of operating taps to "k" (Operation S34). In this case, the control unit 60a turns on the delay tap 10a that was turned off in Operation S25.

The control unit 60 in the FFE filter reduces the number of operating taps in the FFE filter from "k" to "k–1" (Operation S30). The initial value of the number of operating taps as "k" is set to the number (n) of delay taps 10 provided in the FFE filter. The coefficient setting unit 50 reduces the average error that occurs if the number of operating taps is "k–1" (Operation S31). The coefficient setting unit 50 stores the coefficients C0 to Ck–1 corresponding to the result, which is obtained in Operation S31, in the coefficient storage unit 14 and the coefficient storage units 12 in the FFE filter (Operation S32).

The control unit 60 in the FFE filter determines whether or not the absolute value of the value, which is obtained by subtracting the average error that occurs if the number of operating taps is "k–1" from the average error that occurs if the number of operating taps is "k," is less than the threshold value (Operation S33). If Yes in Operation S33, Operations S30, S31, S32, and S33 are again performed. If No in Operation S33, the control unit 60 in the FFE filter resets the number of operating taps to "k" (Operation S34). In this case, the control unit 60 turns on the delay tap 10 that was turned off in Operation S30.

According to the flowchart illustrated in FIG. 10, the power consumption of the adaptive equalizer 103 may be reduced while the adaptive equalization accuracy is maintained. If the FFR filter is enhanced after the DFE filter is enhanced, the result of feedback of the DFE filter may be used to enhance the FFE filter. Consequently, as illustrated in the flowchart in FIG. 10, the FFE filter is preferably enhanced after the DFE filter is enhanced.

Fifth Embodiment

Figure 11:
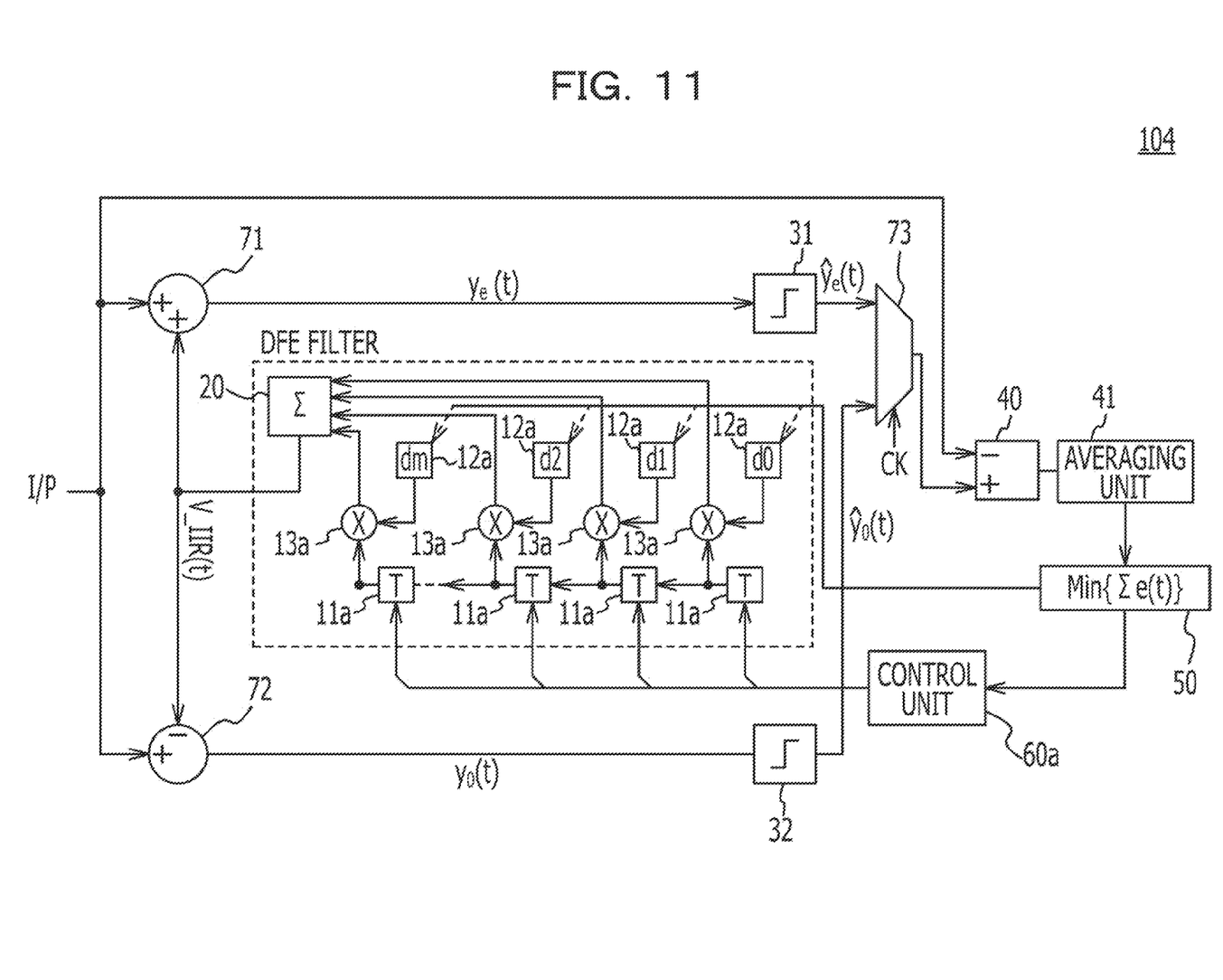
FIG. 11 is a block diagram illustrating an entire configuration of an adaptive equalizer according to a fifth embodiment.

FIG. 11 is a block diagram illustrating an entire configuration of an adaptive equalizer 104 according to a fifth embodiment. The adaptive equalizer 104 includes the DFE filter according to the third embodiment as an equalization circuit. The adaptive equalizer 104 is different from the adaptive equalizer 102 according to the third embodiment in that the adaptive equalizer 104 includes an addition unit 71, a subtraction unit 72, and a multiplexing unit 73, and in that the adaptive equalizer 104 further includes a first identification unit 31 and a second identification unit 32 instead of the identification unit 30. According to the fifth embodiment, the DFE filter, the addition unit 71, the addition unit 71, the first identification unit 31, and the second identification unit 32 function as an Infinite Impulse Response (IIR) filter.

The signal (I/P) to be input into the adaptive equalizer 104 is input into the addition unit 71 and the addition unit 72. Moreover, an output V_IIR(t) of the addition unit 20 is input into the addition unit 71 and the addition unit 72. The addition unit 71 inputs the addition result of the signal (I/P) and the output v_IIR(t) as an equalization output ye(t) into the first identification unit 31. The subtraction unit 72 inputs the result, which is obtained by subtracting the output V_IIR(t) from the signal (I/P), as an equalization output y0(t) into the second identification unit 32.

The first identification unit 31 outputs the data in which the equalization output ye(t) is identified as "0" and "1" to the multiplexing unit 73. The second identification unit 32 outputs the data in which the equalization output y0(t) is identified as "0" and "1" to the multiplexing unit 73. The multiplexing unit 73 generates and outputs decoding data by combining generation data of the first identification unit 31 and the generation data of the second identification unit 32 at input timing of a clock signal.

The decoding data is input into the delay tap 10a at the forefront stage (the first stage). The decoding data is input into the delay taps 10a in the sequence from the delay tap 10a at the first stage to the delay taps 10a at the latter stage. Each of the delay units 11a adds the delay amount of the prescribed time to a signal to be input and outputs the signal. The efficient storage units 12a of the delay taps 10a store the coefficients d1 to dm (m is an integral number more than 2), respectively. In the delay tap 10a, the multiplication unit 13a inputs, into the addition unit 20, the multiplication result of the decoding data added with the delay amount by the delay unit 11a and the coefficient stored in the coefficient storage unit 12a.

On the other hand, the decoding data generated by the multiplexing unit 73 is also input into the positive side of the subtraction unit 40. The signal (I/P) is also input into the negative side of the subtraction unit 40. The subtraction unit 40 calculates the error value e(t) by subtracting the signal (I/P) from the decoding data. The averaging unit 41 calculates and outputs the average value |Avg{e(t)}| of the error value e(t) as an average error. The coefficient setting unit 50 reduces the average error. The coefficient setting unit 50 updates the coefficients d1 to dm in the multiplication units 13a to the coefficients corresponding to the reduction of the average error and outputs the coefficients to the coefficient storage units 12a, respectively. Consequently, the coefficients d1 to dm are enhanced. There is a least-mean-square method as a method for calculating the coefficients d1 to dm.

According to the fifth embodiment, as in the first embodiment, the control unit 60 may reduce the number of operating taps within the range where the average error is less than the threshold value. The control unit 60 may reduce the number of operating taps until the reduction amount of the average error, which occurs when the number of operating taps is reduced, becomes equal to or less than the prescribed value. As in the second embodiment, the control unit 60 may reduce the number of operating taps by stopping the power supply to the delay tap 10a whose coefficient to be set is sufficiently small. This makes it possible to reduce the power consumption of the adaptive equalizer 104 while the adaptive equalization accuracy is maintained.

Sixth Embodiment

Figure 12:
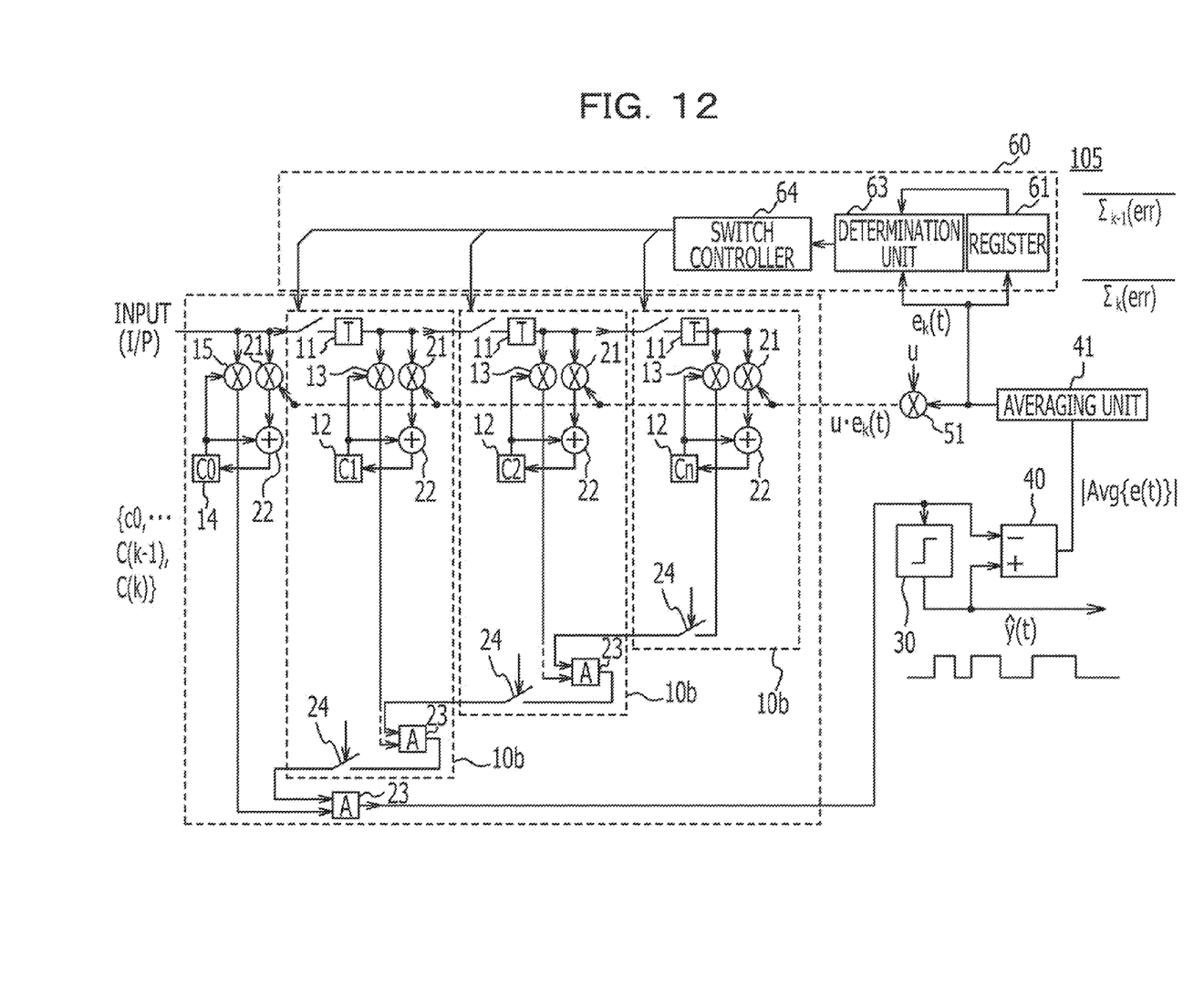
FIG. 12 is a block diagram illustrating an entire configuration of an adaptive equalizer according to a sixth embodiment.

FIG. 12 is a block diagram illustrating an entire configuration of an adaptive equalizer 105 according to a sixth embodiment. With reference to FIG. 12, the adaptive equalizer 105 is different from the adaptive equalizer 100 illustrated in FIG. 1 in that the adaptive equalizer 105 includes delay taps 10b instead of the delay taps 10. The delay tap 10b is different from the delay tap 10 in that the delay tap 10b includes a multiplication unit 21, an addition unit 22, an addition unit 23, and a switch 24.

The signal (I/P) to be input into the adaptive equalizer 105 is input into the delay taps 10b in the sequence from the delay tap 10b at the first stage to the delay taps 10b at the latter stage. Each of the delay units 11 adds the delay amount of the prescribed time to a signal to be input and outputs the signal. The coefficient storage unit 12, which is a storage unit such as a register, stores the coefficient to be input from the addition unit 22. The multiplication unit 13 outputs, to the addition unit 23, the multiplication result of the signal (I/P) added with the delay amount by the delay unit 11 and the coefficient stored in the coefficient storage unit 12.

The addition unit 23 adds the output result of the multiplication unit 13 and the output result of the addition unit 23 of the delay tap 10b at the next stage. If the switch 24 is turned on, the output result of the addition unit 23 is output to the addition unit 23 of the delay tap 10b at the former stage. For example, in the delay tap 10b at the second stage, the addition unit 23 adds the output result of the multiplication unit 13 and the output result of the addition unit 23 of the delay tap 10b at the next stage. If the switch 24 is turned on, the output result of the addition unit 23 is input into the addition unit 23 of the delay tap 10b at the first stage.

The addition unit 23 is not provided in the delay tap 10b at the final stage. At the former stage of the delay tap 10b at the forefront stage, the coefficient storage unit 14, the multiplication unit 15, the multiplication unit 21, the addition unit 22, and the addition unit 23 are provided. The multiplication unit 15 outputs, to the addition unit 23, the multiplication result of the signal (I/P) input into the adaptive equalizer 105 and the coefficient stored in the coefficient storage unit 14. The addition unit 23 adds the output result of the multiplication unit 15 and the output result of the addition unit 23 of the delay tap 10b at the first stage, and inputs the results as the equalization output y(t) into the identification unit 30 and the negative side of the subtraction unit 40.

The identification unit 30 generates and outputs decoding data by identifying the equalization output y(t) as "0" and "1." The generated decoding data is input into the positive side of the subtraction unit 40. The above-described equalization output is input into the negative side of the subtraction unit 40. The subtraction unit 40 calculates the error value e(t) by subtracting the equalization output from the decoding data. The averaging unit 41 calculates and outputs the average value |Avg{e(t)}| of the error value e(t) as an average error.

The adaptive equalizer 105 according to the sixth embodiment is provided with a multiplication unit 51 instead of the coefficient setting unit 50. The multiplication unit 51 inputs, into the multiplication unit 21 of each of the delay taps 10b, the multiplication result of an error value $e_k(t)$ obtained by the subtraction unit 40 and a coefficient u that is less than 1. In this case, the error value $e_k(t)$ is an error value obtained if the number of operating taps is "k." In each of the delay taps 10b, the multiplication unit 21 uses $u \cdot e_k(t)$ input from the multiplication unit 51, sets another coefficient according to the following formula (4), and stores the coefficient in the coefficient storage unit 12. The calculation coefficient of each of the delay taps 10b may be enhanced by using the above-described least-mean-square method. In the formula (4), old C(k) indicates the coefficient that is stored in the coefficient storage unit 12 immediately before the formula (4) is calculated. Moreover, y(t−kt) indicates a signal to be input into the delay tap 10b at the "k"-th stage, and "T" indicates a delay amount of each of the delay units 11. The multiplication unit 21 and the addition unit 22 at the former stage of the delay tap 10b at the forefront stage have the function equivalent to the delay tap 10b.

$$\text{new}\_C(k) = \text{old}\_C(k) + y(t-kT) \cdot u \cdot e_k(t) \quad (4)$$

According to the sixth embodiment, the calculation coefficient of each of the delay taps 10b is enhanced even if the coefficient setting unit 50 according to the first, second, third, fourth, and fifth embodiments is not provided. As described above, the coefficient is self-enhanced in each of the delay taps 10b, so that the number of delay taps 10b having the power supply is to be stopped by the switch controller may be increased. As a result, the power consumption may be further reduced.

According to the above-described embodiments, the delay tap performs multiplication as calculation. However, the calculation is not limited to multiplication. The delay tap my perform any type of calculation and may perform weighting or the like.

The present invention is intended to solve the above-described problems. An aspect of the present invention is to provide an adaptive equalizer and an adaptive equalizing method for reducing the power consumption while the equalization accuracy is maintained.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the invention have been described in detail, it should be understood that the various changes, substitutions, and alterations could be made hereto without departing from the spirit and scope of the invention.

What is claimed is:

1. An adaptive equalizer comprising:
    an equalization circuit, which includes a plurality of delay taps which are cascade-coupled, to equalize an input signal by adding up calculation results of the plurality of delay taps; and
    an operation number change circuit to change a number of operations of the plurality of delay taps according to an equalization error of the equalization circuit,
    wherein the operation number change circuit reduces the number of operations of the delay tap until a reduction amount of the equalization error, which is obtained when the number of operations of the delay tap is reduced, becomes equal to or less than a prescribed value.

2. The adaptive equalizer according to claim 1, further comprising:
    an equalization error generator to generate the equalization error of the equalization circuit.

3. The adaptive equalizer according to claim 2, wherein the equalization error generator includes an identification circuit and a subtraction circuit.

4. The adaptive equalizer according to claim 1, wherein the operation number change circuit reduces the number of operations by stopping a power supply to the plurality of delay taps, respectively.

5. The adaptive equalizer according to claim 4, wherein to reduce the number of operations of the plurality of delay taps, the operation number change circuit stops the power supply to the delay tap at a final stage among the delay taps during operation.

6. The adaptive equalizer according to claim 1, wherein the operation number change circuit reduces the number of operations of the delay tap when the equalization error is equal to or less than a prescribed value.

7. The adaptive equalizer according to claim 1, wherein when a calculation coefficient of any delay tap is equal to or less than a prescribed value, the operation number change circuit stops the power supply to the delay tap.

8. The adaptive equalizer according to claim 1, wherein the equalization error is an average error of an output which is output from the equalization circuit.

9. The adaptive equalizer according to claim 8, wherein the average error is an average value of a difference between the output from the equalization circuit and decoding data obtained by identifying the output from the equalization.

10. The adaptive equalizer according to claim 1, wherein the equalization circuit includes at least any one of a Feed Forward Equalization (FFE) filter, a Decision Feedback Equalization (DFE) filter, and an Infinite Impulse Response (IIR) filter.

11. The adaptive equalizer according to claim 1, further comprising:
    a coefficient setting circuit to enhance a calculation coefficient of the delay tap,
    wherein the coefficient setting circuit sets the calculation coefficient of the delay tap so that the equalization error of the equalization circuit is reduced.

12. The adaptive equalizer according to claim 1, wherein the delay tap performs feedback control of the calculation coefficient of the delay tap by a least-mean-square method.

13. An adaptive equalizing method comprising:
    equalizing an input signal by adding a calculation result with respect to the input signal of a plurality of delay taps which are cascade-coupled; and
    changing a number of operations of the plurality of delay taps according to an equalization error that occurs when the input signal is equalized,
    wherein the reducing the number of operations of the delay tap until a reduction amount of the equalization error, which is obtained when the number of operations of the delay tap is reduced, becomes equal to or less than a prescribed value.

14. The adaptive equalizing method according to claim 13, wherein reducing the number of operations by stopping a power supply to the plurality of delay taps, respectively.

15. The adaptive equalizing method according to claim 14, wherein reducing the number of operations of the plurality of delay taps by stopping the power supply to the delay tap at a final stage among the delay taps during operation.

16. The adaptive equalizing method according to claim 13, wherein reducing the number of operations of the delay tap when the equalization error is equal to or less than a prescribed value.

17. The adaptive equalizing method according to claim 13, wherein stopping the power supply to the delay tap when the calculation coefficient of any delay tap is equal to or less than a prescribed value.

18. The adaptive equalizing method according to claim 13, wherein the equalization error is an average error of an output.

* * * * *